UNITED STATES PATENT OFFICE.

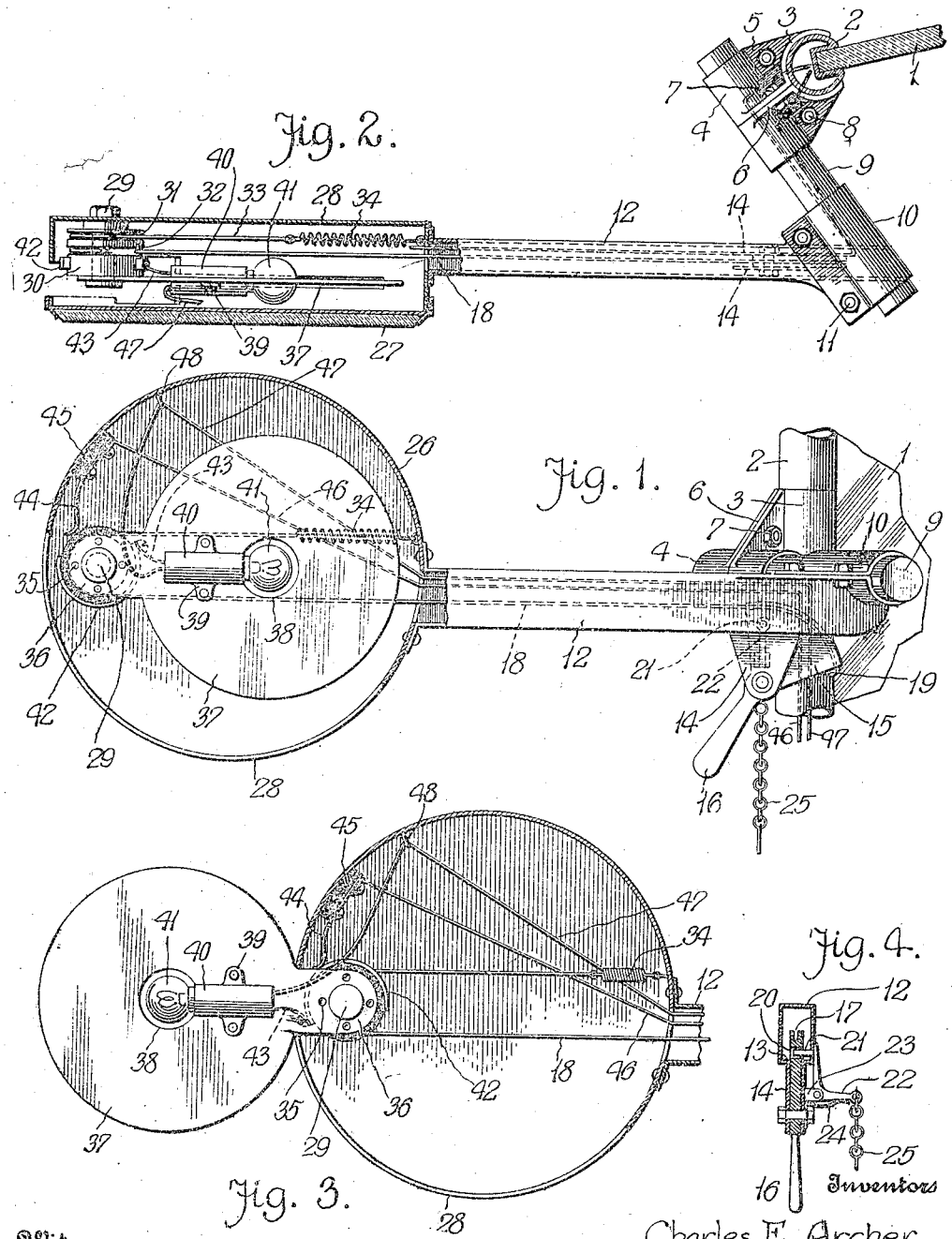

EDWARD C. HUMPHREYS AND CHARLES E. ARCHER, OF DETROIT, MICHIGAN.

TRAFFIC-SIGNAL.

1,262,799. Specification of Letters Patent. Patented Apr. 16, 1918.

Application filed November 1, 1916. Serial No. 128,365.

*To all whom it may concern:*

Be it known that we, EDWARD C. HUMPHREYS and CHARLES E. ARCHER, citizens of the United States of America, residing at Detroit, in the county of Wayne and State of Michigan, have invented certain new and useful Improvements in Traffic-Signals, of which the following is a specification, reference being had therein to the accompanying drawings.

This invention relates to signals for automobiles and other vehicles and has special reference to a semaphore signal adapted for attachment to the frame of a windshield or other parts of an automobile or vehicle convenient to the chauffeur.

The primary object of our invention is to combine a semaphore signal and reflector and attach the same to a windshield frame or other support in a manner that permits of ready adjustment of the reflector so that the same may be conveniently used by a chauffeur in making desired observations relative to traffic in the rear or to one side of the reflector carrying automobile.

Another object of this invention is to provide an automatically actuated semaphore signal with means of illumination automatically controlled, and provision is made for easily and quickly restoring the semaphore to normal or inactive position after having been automatically actuated.

A further object of our invention is to provide an automobile signal wherein the parts are constructed with a view to reducing the cost of manufacture and at the same time retain the features by which compactness, durability, and ease of assembling the parts are secured. With such ends in view, our invention resides in the novel construction, combination and arrangement of parts to be hereinafter specifically described and then claimed.

Reference will now be had to the drawings, wherein—

Figure 1 is a front elevation of the signal, partly broken away and partly in section, showing the semaphore arm in a retracted or inactive position;

Fig. 2 is a plan of the same, partly broken away and partly in section;

Fig. 3 is a vertical sectional view of the signal casing showing the semaphore arm in an extended or active position; and Fig. 4 is a cross sectional view of a manually actuated device forming part of the signal.

In the drawings, 1 denotes a portion of a windshield having a frame 2 and this windshield frame is simply illustrated as an example of a support in connection with an automobile for our improved signal. Attached to the windshield frame 2 and capable of lateral or horizontal adjustment about the vertical axis of the frame 2, is a clamp member comprising clamping portions 3 and bracket clamping portions 4. The clamp member, as a matter of good construction, is preferably made of four pieces with the clamping portions 3 and 4 cylindrical and connected by webs 5 and 6, said webs adding rigidity to the frame clamping portions 3 and the bracket clamping portions 4, so that the frame clamping portions 3 are firmly held at a right angle to bracket clamping portions 4. The webs 6 are connected by screw bolts and nuts, generally designated 7, constituting means for firmly clamping the frame clamping portions 3 on the windshield frame 2, and the webs 5 are connected by similar means 8 which permit of the clamping portions 4 of the member firmly holding a bracket arm 9. This arm is tubular or a solid rod cored out, and through the medium of the frame clamping portions 3, said bracket rod may be positioned at a desired angle relative to the windshield.

Mounted on the bracket rod 9 is an adjustable clamping member 10 held by screw bolts and nuts, generally designated 11. The lower portion of this adjustable bracket member supports a hollow casing arm 12, practically rectangular in cross section, and by adjusting the clamping member 10 upon the bracket rod 9, the casing arm 12 may be shifted in a vertical plane. The inner end of the casing arm 12 has a slot 13 and depending lugs or hangers 14. Between the lugs 14 is pivotally mounted a sector shaped retracting member 15 having a handle 16 by which said member may be easily moved. The retracting member 15 extends through the slot 13 of the casing arm 12 into said casing and is provided with a groove 17 to receive a cable 18, said cable having the inner end thereof connected to the member 15, as at 19. The retracting member 15 is also provided with a transverse opening 20, and adapted to extend in said opening is a pin 21 carried by a bell crank 22 pivotally mounted between apertured ears 23, carried by one of the lugs 14 of the casing arm. The pin 21 extends through a side opening in the casing arm 12 and said pin is normally retained in the opening 20 of the retracting member 15 by a flat spring 24 engaging the bell crank 22 and held by the pivotal means of the retracting member 15. A chain or other cable 25 is connected to the bell crank 22 to facilitate moving said bell crank to retract the pin 21 relative to the retracting member 15.

Secured to the outer ends of the casing arm 12 and communicating therewith is a cylindrical or drum shaped casing 26 and suitably mounted upon the flat wall of said casing is a mirror or reflector 27. By adjusting the windshield clamp member the reflector 27 may be swung in a horizontal plane so that rear observations may be made at a desired angle, and by adjusting the clamping member 10 upon the bracket rod, the reflector 27 may be tilted at a desired angle so that observations may be made in proximity to the rear end of the reflector carrying vehicle or a distance behind the same.

The casing 26 has the cylindrical wall thereof provided with a bottom slot 28 and that wall of the casing opposite the reflector carrying wall is provided with a stud 29 contiguous to the outer end of the slot 28. Rotatable on the stud 29 is a spool 30, preferably furnished with insulating material and said spool has peripheral grooves 31 and 32. Attached to the spool and trained in the groove 31 thereof is a cable or flexible connection 33 attached to a coiled retractile spring 34 suitably connected to the cylindrical wall of the casing 26. The retractile force of the spring 34 is sufficient to rotate the spool 30 clockwise and said spring can be placed under tension by rotating the spool 30 counterclockwise. To do so, the cable or flexible connection 18 is carried through the arm 12 into the casing 26 and attached to the spool 30 in the peripheral groove 32, and in consequence of this arrangement, the retracting member 15 can be manually actuated to rotate the spool 30 and place the spring 34 under tension, as shown in Figs. 1 and 2.

Attached to the end of the spool 30 by screws 35 or other fastening means is the radial extension 36 of a flat circular or disk shaped semaphore arm 37 adapted to be housed within the casing 26 in parallelism with the flat walls thereof. The semaphore arm 37 is susceptible of any desired finish preferably red in color and is made as large as possible so that it may be readily observed when swung out of the casing 26 to an active position, as shown in Fig. 3. Assuming that the semaphore arm is held within the casing 26 in an inactive position by the cable 18 and the pin 21 engaging in the retracting member 15, it is only necessary to release the retracting member 15 to permit of the spring 34 swinging the semaphore arm out of the casing to an active position. The release of the retractile member 15 is easily and quickly accomplished by pulling upon the chain or cable 25, and as soon as the pin 21 is retracted, the retractile force of the spring 34 is sufficient to partially rotate the spool 30 and swing the semaphore arm 37 downwardly in an arc until the radial extension 36 of said semaphore arm abuts an end wall of the slot 28. To restore the semaphore arm to an inactive position, it is only necessary to push outwardly upon the handle 16 of the retracting member 15, until the pin 21 snaps into the opening 20 of the retracting member, and then the spring 34 will be held under tension and in condition to automatically swing the semaphore arm to an active position when the retracting member 15 is released.

In order that the semaphore arm 37 may be illuminated at night, said arm has a central opening 38 and a radiating slot 39. Mounted in the slot 39 is the socket 40 of an incandescent lamp 41. This lamp is in circuit with a suitable source of electrical energy and the illumination thereof automatically controlled in the following manner: On the insulation of the spool 30 there is an arc contact member 42 and one end thereof is connected to the lamp socket 40 by a wire 43. Adapted to be engaged or wiped by the contact member 42 is a resilient contact finger or brush 44 on a block of insulation 45 secured to the inner side of the casing 26. A lead-in wire 46 is connected to the fixed end of the contact finger or brush 44 and another lead-in wire 47 connected to the lamp socket 40, the last mentioned wire being suspended in the top of the casing 26 through the medium of a staple or holder 48. The lead-in wires 46 and 47 extend through the casing arm 12 and may extend out of the inner end of the casing arm to a suitable source of electrical energy, but, as shown, it is preferable to carry the lead-in wires through the hollow or cored out bracket rod 9 and into the frame 2 of the windshield, thereby protecting all electrical connections and enhancing the general appearances of the signal by having such connections invisible.

By reference to Fig. 1, it will be observed that the circuit to the lamp 41 is open by reason of the contact finger or brush 44 being out of engagement with the contact member 42. When the semaphore arm 37 is swung to an active extended position, the contact member 42 rides into engagement with the contact finger or brush 44 and completes a circuit which will light the lamp 41. In order that the signal may be used during the day without the semaphore arm being illuminated, an ordinary switch will be installed in the circuit and such switch, as well as other similar electrical devices that may be used, do not form any part of our invention.

We attach considerable importance to the fact that we utilize a reflector support as a housing for a semaphore arm and that by having the semaphore arm spring actuated, it is possible to more quickly operate the signal, for instance in an emergency, than what it would be to swing a semaphore arm by hand. As it is, a jerk on the chain or cable 25 accomplishes the desired result, and the semaphore arm may be reset at leisure. It is also possible to wigwag the semaphore arm in connection with a predescribed code for signaling to the rear, and we would have it understood that the device may be used for other purposes than those herein mentioned, and that the structural elements are susceptible of such variations and modifications as fall within the scope of the appended claim.

What we claim is:—

In a traffic signal, a hollow arm adapted for attachment to an automobile or other vehicle and capable of adjustment in planes at right angles to each other, a cylindrical casing carried by the outer end of said hollow arm and having the cylindrical wall thereof provided with a slot, a rotatable spool in said casing adjacent the cylindrical wall and at one end of the slot thereof, a circular semaphore arm carried by said spool and adapted to be swung out of the slot of said casing, a spring actuated cable in said casing attached to said spool and normally in condition for swinging said semaphore arm out of said casing, a cable extending through said hollow arm into said casing and attached to said spool for restoring said semaphore arm to normal position within said casing, and a retracting member pivoted at the inner end of said arm and connected to said cable for controlling the operation of the semaphore arm actuating cable.

In testimony whereof we affix our signatures in presence of two witnesses.

EDWARD C. HUMPHREYS.
CHARLES E. ARCHER.

Witnesses:
KARL H. BUTLER,
ANNA M. DORR.